United States Patent
Roth et al.

(10) Patent No.: US 7,036,000 B2
(45) Date of Patent: Apr. 25, 2006

(54) VALID BIT GENERATION AND TRACKING IN A PIPELINED PROCESSOR

(75) Inventors: Charles P. Roth, Austin, TX (US);
Ravi P. Singh, Austin, TX (US);
Gregory A. Overkamp, Austin, TX (US); Thomas Tomazin, Austin, TX (US)

(73) Assignees: Intel Corporation, Santa Clara, CA (US); Analog Devices, Inc., Norwood, MA (US)

( * ) Notice: Subject to any disclaimer, the term of this patent is extended or adjusted under 35 U.S.C. 154(b) by 29 days.

(21) Appl. No.: 10/847,837

(22) Filed: May 17, 2004

(65) Prior Publication Data

US 2004/0210744 A1 Oct. 21, 2004

Related U.S. Application Data

(63) Continuation of application No. 09/675,712, filed on Sep. 29, 2000, now Pat. No. 6,754,808.

(51) Int. Cl.
*G06F 9/38* (2006.01)

(52) U.S. Cl. ...................... 712/218; 712/219

(58) Field of Classification Search ................ 712/218, 712/219, 204, 205, 206, 207, 23, 24, 25
See application file for complete search history.

(56) References Cited

U.S. PATENT DOCUMENTS

| | | | |
|---|---|---|---|
| 5,133,077 A | 7/1992 | Karne et al. | |
| 5,487,156 A | 1/1996 | Popescu et al. | |
| 5,539,911 A | 7/1996 | Nguyen et al. | |
| 5,781,753 A | 7/1998 | McFarland et al. | |
| 5,835,967 A * | 11/1998 | McMahan | 711/213 |
| 5,968,169 A | 10/1999 | Pickett | |
| 6,195,744 B1 * | 2/2001 | Favor et al. | 712/215 |
| 6,279,100 B1 | 8/2001 | Tremblay et al. | |
| 6,542,987 B1 | 4/2003 | Fischer et al. | |
| 6,609,193 B1 | 8/2003 | Douglas et al. | |
| 6,629,231 B1 | 9/2003 | Lohman | |

* cited by examiner

*Primary Examiner*—Henry W. H. Tsai
(74) *Attorney, Agent, or Firm*—Fish & Richardson P.C.

(57) ABSTRACT

In an embodiment, a pipelined digital signal processor (DSP) may generate a valid bit in an alignment stage. The valid bit may be qualified in a decode stage in response to receiving a stall signal and/or a kill signal. The valid bit output from the decode stage may be stored in a latch in an address calculation (AC) stage. The valid bit may be held in the latch by a latch enable circuit in response to receiving a stall signal. The valid bit output from the latch may be qualified in the AC stage. The circuit in the AC stage including the latch, the latch enable circuit, and a valid bit qualifier may be repeated in downstream pipeline stages, for example, the execution stages.

11 Claims, 5 Drawing Sheets

VALID BIT GENERATION AND TRACKING IN A PIPELINED PROCESSOR

CROSS-REFERENCE TO RELATED APPLICATIONS

This application is a continuation application of and claims priority to U.S. application Ser. No. 09/675,712, filed on Sep. 29, 2000 now U.S. Pat. No. 6,754,808.

TECHNICAL FIELD

This invention relates to pipelined processors, and more particularly to generating and tracking valid and invalid instructions in the instruction pipeline.

BACKGROUND

Digital signal processing is concerned with the representation of signals in digital form and the transformation or processing of such signal representation using numerical computation. Digital signal processing is a widely used technology for many of today's high technology products in fields such as wireless communications, networking, and multimedia. One reason for the prevalence of digital signal processing technology has been the development of low cost, powerful digital signal processors (DSPs) that provide engineers the reliable computing capability to implement these products cheaply and efficiently. Since the development of the first DSPs, DSP architecture and design have evolved to the point where even sophisticated real-time processing of video-rate sequences can be performed.

DSPs are often used for a variety of multimedia applications such as digital video, imaging, and audio. DSPs can manipulate the digital signals to create and open such multimedia files.

MPEG-1 (Motion Picture Expert Group), MPEG-2, MPEG-4 and H.263 are digital video compression standards and file formats. These standards achieve a high compression rate of the digital video signals by storing mostly changes from one video frame to another, instead of storing each entire frame. The video information may then be further compressed using a number of different techniques.

The DSP may be used to perform various operations on the video information during compression. These operations may include motion search and spatial interpolation algorithms. The primary intention is to measure distortion between blocks within adjacent frames. These operations are computationally intensive and may require high data throughput.

The MPEG family of standards is evolving to keep pace with the increasing bandwidth requirements of multimedia applications and files. Each new version of the standard presents more sophisticated algorithms that place even greater processing requirements on the DSPs used in MPEG compliant video processing equipment.

Video processing equipment manufacturers often rely on application-specific integrated circuits (ASICs) customized for video encoding under the MPEG and H.263 standards. However, ASICs are complex to design, costly to produce and less flexible in their application than general-purpose DSPs.

BRIEF DESCRIPTION OF THE DRAWINGS

These and other features and advantages of the invention will become more apparent upon reading the following detailed description and upon reference to the accompanying drawings.

DETAILED DESCRIPTION

Figure 1:
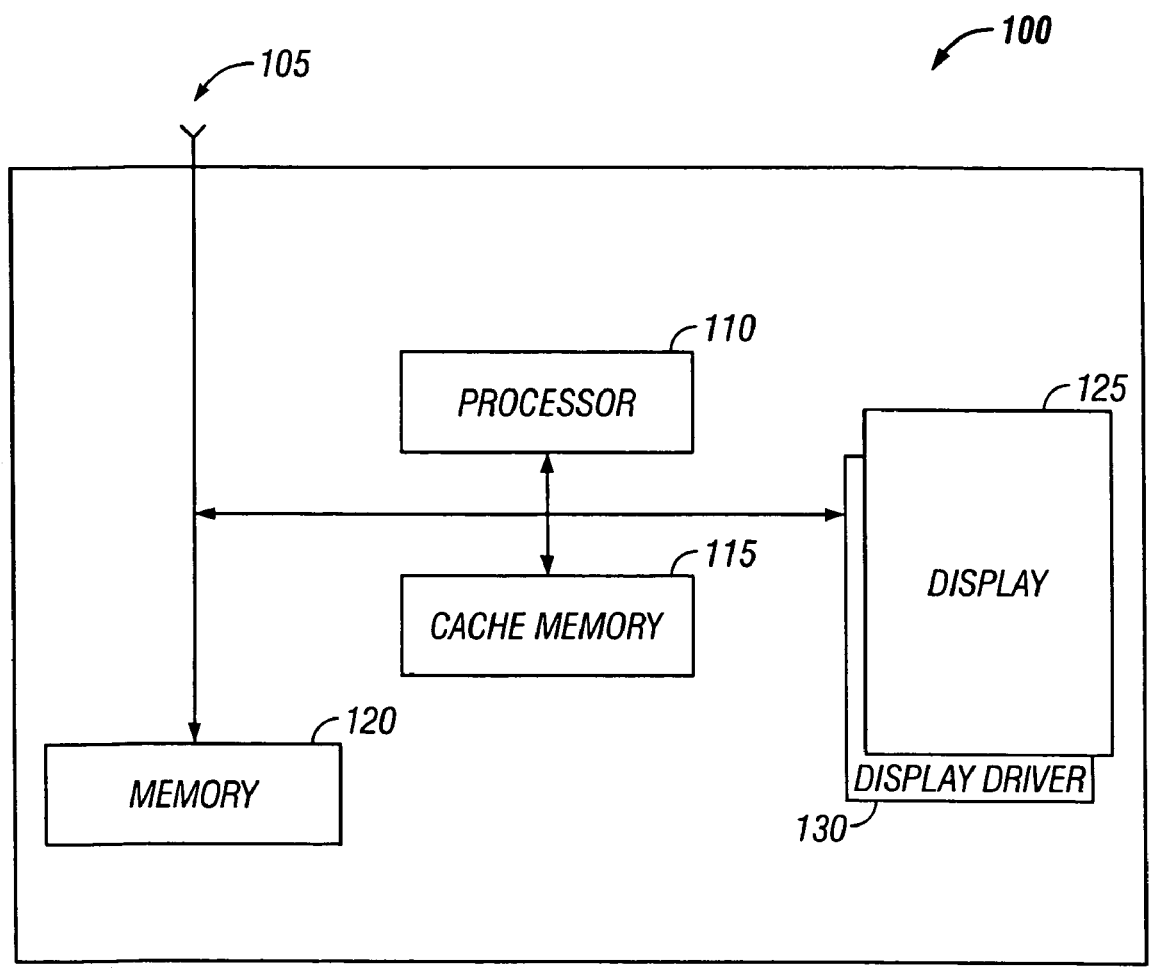
FIG. 1 is a block diagram of a mobile video device utilizing a processor according to an embodiment.

FIG. 1 illustrates a mobile video device 100 including a processor according to an embodiment of the invention. The mobile video device 100 may be a hand-held device which displays video images produced from an encoded video signal received from an antenna 105 or a digital video storage medium 120, e.g., a digital video disc (DVD) or a memory card. A processor 110 communicates with a cache memory 115 which may store instructions and data for the processor operations. The processor 110 may be a microprocessor, a digital signal processor (DSP), a microprocessor controlling a slave DSP, or a processor with a hybrid microprocessor/DSP architecture. For the purposes of this application, the processor 110 will be referred to hereinafter as a DSP 110.

The DSP 110 may perform various operations on the encoded video signal, including, for example, analog-to-digital conversion, demodulation, filtering, data recovery, and decoding. The DSP 110 may decode the compressed digital video signal according to one of various digital video compression standards such as the MPEG-family of standards and the H.263 standard. The decoded video signal may then be input to a display driver 130 to produce the video image on a display 125.

Hand-held devices generally have limited power supplies. Also, video decoding operations are computationally intensive. Accordingly, a processor for use in such a device is advantageously a relatively high speed, low power device.

The DSP 110 may have a deeply pipelined, load/store architecture. By employing pipelining, the performance of the DSP may be enhanced relative to a non-pipelined DSP. Instead of fetching a first instruction, executing the first instruction, and then fetching a second instruction, a pipelined DSP 110 may fetch the second instruction concurrently with execution of the first instruction, thereby improving instruction throughput. Further, the clock cycle of a pipelined DSP may be shorter than that of a non-pipelined DSP, in which the instruction is fetched and executed in the same clock cycle.

Such a DSP 110 may be used for use in video camcorders, teleconferencing, PC video cards, and High-Definition Television (HDTV). In addition, the DSP 110 may also be used for use in connection with other technologies utilizing digital signal processing such as voice processing used in mobile telephony, speech recognition, and other applications.

Figure 2:
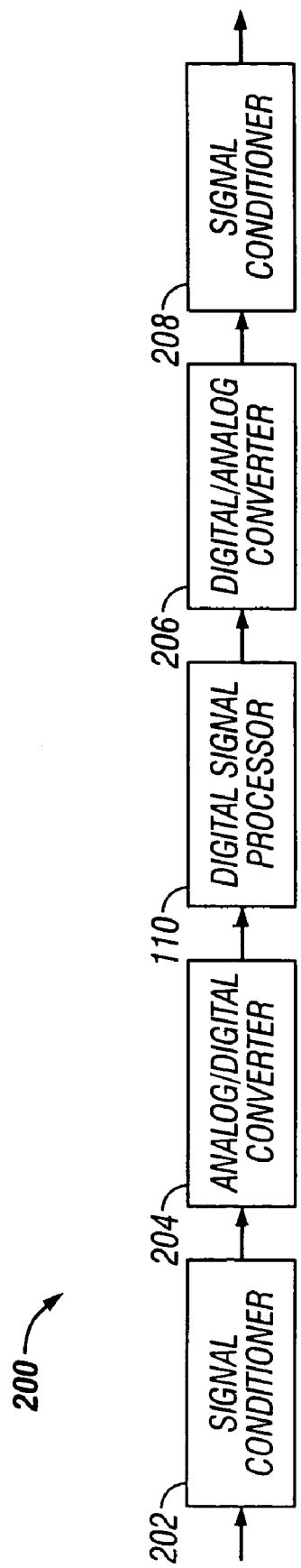
FIG. 2 is a block diagram of a signal processing system according to an embodiment.

Turning now to FIG. 2, a block diagram of a signal processing system 200 including DSP 110 according to an embodiment is shown. One or more analog signals may be provided by an external source, e.g., antenna 105, to a signal conditioner 202. Signal conditioner 202 may be arranged to perform certain preprocessing functions upon the analog signals. Exemplary preprocessing functions may include mixing several of the analog signals together, filtering, amplifying, etc. An analog-to-digital converter (ADC) 204 is coupled to receive the preprocessed analog signals from signal conditioner 202 and to convert the preprocessed analog signals to digital signals consisting of samples, as described above. The samples are taken according to a sampling rate determined by the nature of the analog signals received by signal conditioner 202. The DSP 110 is coupled to receive digital signals at the output of the ADC 204. The DSP 110 performs the desired signal transformation upon the received digital signals, producing one or more output digital signals. A digital-to-analog converter (DAC) 206 is coupled to receive the output digital signals from the DSP 110. The DAC 206 converts the output digital signals into output analog signals. The output analog signals are then conveyed to another signal conditioner 208. The signal conditioner 208 may perform post-processing functions upon the output analog signals. Exemplary post-processing functions are similar to the preprocessing functions listed above. Any suitable configuration of these devices may be coupled into a signal processing system 200 with the DSP 110.

Figure 3:
FIG. 3 is a block diagram of an alternative signal processing system according to an embodiment.

Turning next to FIG. 3, a signal processing system 300 according to another embodiment is shown. In this embodiment, a digital receiver 302 may be arranged to receive one or more digital signals and to convey the received digital signals to the DSP 110. As with the embodiment shown in FIG. 2, DSP 110 performs the desired signal transformation upon the received digital signals to produce one or more output digital signals. Coupled to receive the output digital signals may be a digital signal transmitter 304. In one exemplary application, the signal processing system 300 may be a digital audio device in which the digital receiver 302 conveys to the DSP 110 digital signals indicative of data stored on the digital storage device 120. The DSP 110 may then process the digital signals and may convey the resulting output digital signals to the digital transmitter 304. The digital transmitter 304 may then cause values of the output digital signals to be transmitted to the display driver 130 to produce a video image on the display 125.

Figure 4:
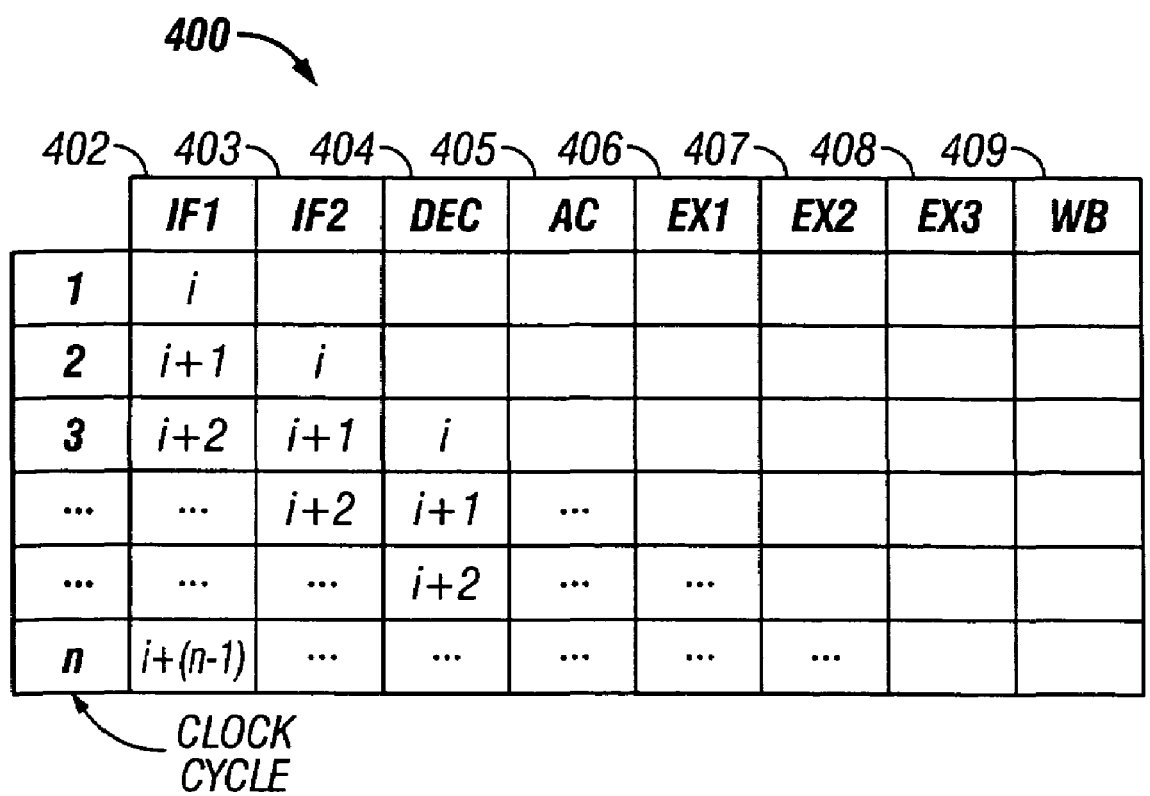
FIG. 4 illustrates exemplary pipeline stages of the processor in FIG. 1 according to an embodiment.

The pipeline illustrated in FIG. 4 may include eight stages, which may include instruction fetch 402–403, decode 404, address calculation 405, execution 406–408, and write-back 409 stages. An instruction i may be fetched in one clock cycle and then operated on and executed in the pipeline in subsequent clock cycles concurrently with the fetching of new instructions, e.g., i+1 and i+2.

Pipelining may introduce additional coordination problems and hazards to processor performance. Jumps in the program flow may create empty slots, or "bubbles," in the pipeline. Situations which cause a conditional branch to be taken or an exception or interrupt to be generated may alter the sequential flow of instructions. After such an occurrence, an new instruction must be fetched outside of the sequential program flow, making the remaining instructions in the pipeline irrelevant. Methods such as data forwarding, branch prediction, and associating valid bits with instruction addresses in the pipeline may be employed to deal with these complexities.

Instructions in a pipeline may become invalid for a variety of reasons. Such invalid instructions may complicate the handling and flow of other valid instructions in the pipeline. According to an embodiment, a 1-bit "valid bit" may be associated with each instruction in the pipeline. The valid bits may be tracked and set to a either a HIGH value to indicate a valid instruction, or a LOW value to indicate an invalid instruction. The valid bit may be fully interlocked with the corresponding instruction and data in each pipeline stage. Instead of qualifying the corresponding instruction or data in the pipeline as valid or invalid in each pipeline stage, only the valid bit may be qualified. Qualifying a 1-bit valid bit instead of a (multi-) bit instruction or data may preserve processor resource and improve performance. The state of the valid bit may be the final determinate in the write back stage as to whether the DSP 110 commits to the instruction and writes any corresponding result to memory.

Figure 5:
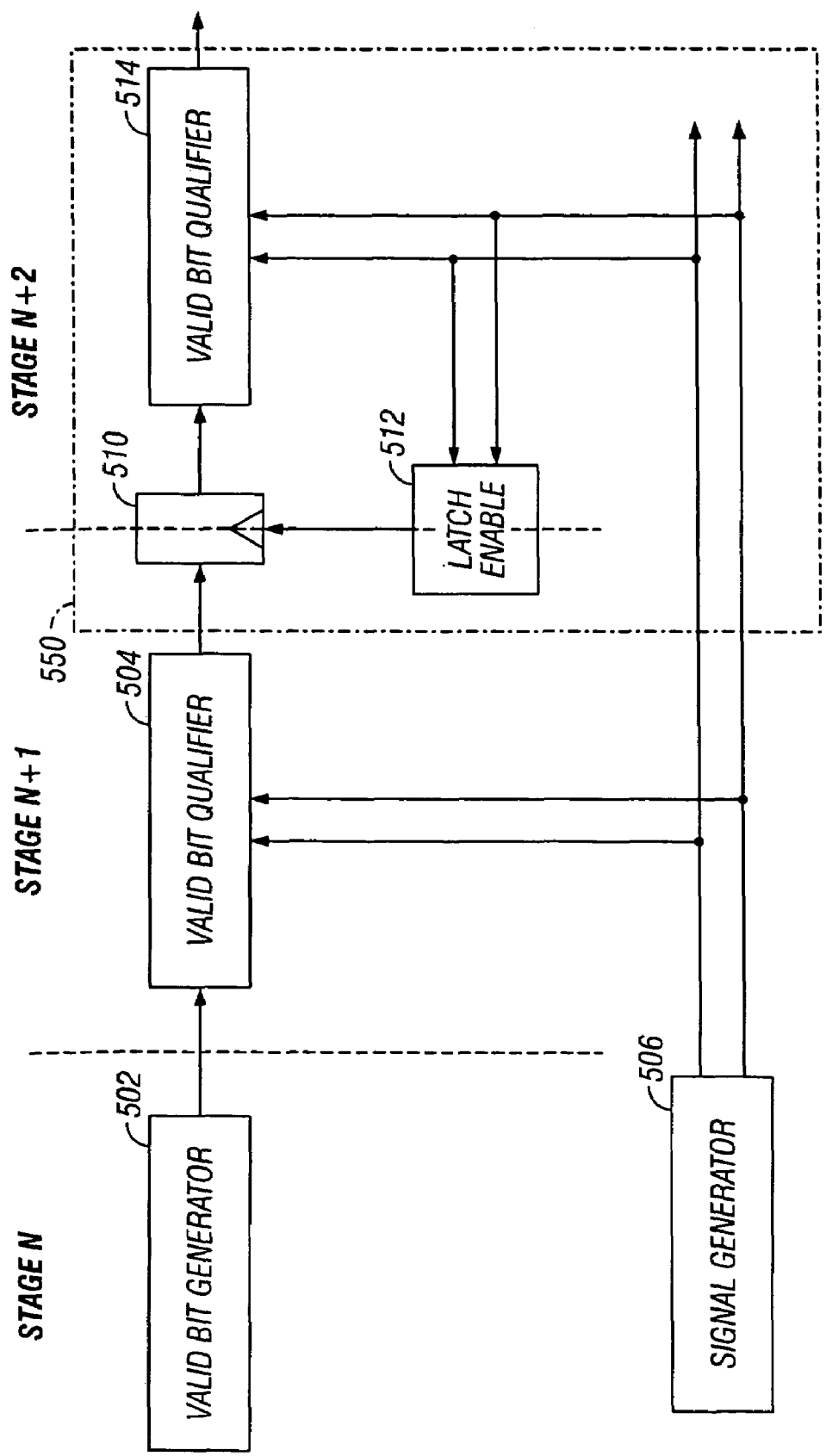
FIG. 5 illustrates a valid bit pipeline for generating and tracking a valid bit according to an embodiment.

FIG. 5 illustrates a valid bit pipeline 500 according to an embodiment for tracking valid bits associated with instructions in a pipeline. A valid bit may be generated in a stage "n" in the pipeline by a valid bit generator 502. The valid bit may have either a HIGH (valid) value or a LOW (invalid) value. An instruction designated as invalid may not subsequently be made valid. Thus, a valid bit with a LOW value may not be changed to a HIGH value in subsequent pipeline stages.

The generated valid bit may be input to a valid bit qualifier 504 in pipeline stage n+1. The valid bit qualifier 504 may qualify the valid bit in response to being presented a stall signal and/or a kill signal generated by a signal generator 506. As described above, the valid bit qualifier 504 may not change the value of the valid bit from LOW (invalid) to HIGH (valid), but may change the value of the valid bit from HIGH (valid) to LOW (invalid) if the corresponding instruction is stalled and/or "killed" in that stage, as indicated by a stall signal and/or kill signal.

An instruction may be "killed" if it is no longer valid for the current program flow. This may occur when an interrupt is taken. When an interrupt occurs, all instructions in the pipeline may be killed and instructions from an interrupt service routine (ISR) may be fetched and introduced into the pipeline. When an instruction in a given pipeline stage is killed, the instructions in the previous (upstream)-stages may also be killed.

When a pipeline stage is stalled, an instruction in that stage may be held there for one, or possibly several, cycles. This may occur, for example, if the data required to execute the instruction is not yet available. While that instruction is stalled, subsequently fetched instructions upstream in the pipeline may be held in their respective stages. However, a previously fetched instruction downstream in the pipeline, i.e., closer to the write back stage, may be allowed to continue down the pipeline. Bubbles may be inserted into the pipeline in the stages between the instruction causing the stall and the previously fetched instruction as it continues to move downstream in the pipeline. When an instruction in a given pipeline stage is stalled, the instructions in the previous (upstream) stages may also be stalled.

After being qualified by the valid bit qualifier 504, the valid bit may be input to a latch 510. The latch 510 may be controlled by a latch enable circuit 512. The value of the valid bit in the latch 510 may not be written over or input to the next stage in the next cycle if the latch 510 is not enabled by the latch enable circuit 512. The latch enable circuit 512 may hold the valid bit in the latch 510 in response to a stall signal, thereby keeping the valid bit in the same stage as the stalled instruction. However, if the stalled instruction is killed, the latch enable circuit 512 may enable the latch 510, allowing it to pass the killed valid bit to the next stage on the next clock cycle. Thus, a stage may not be stalled for a killed instruction.

Once enabled, the valid bit from the latch 510 may be input to a valid bit qualifier 514 in stage n+2 on the next clock cycle. The valid bit qualifier 514 may qualify the valid bit in response to being presented with a stall signal and/or a kill signal for that stage. Once qualified, the valid bit may be input to the next stage in the pipeline.

Figure 6:
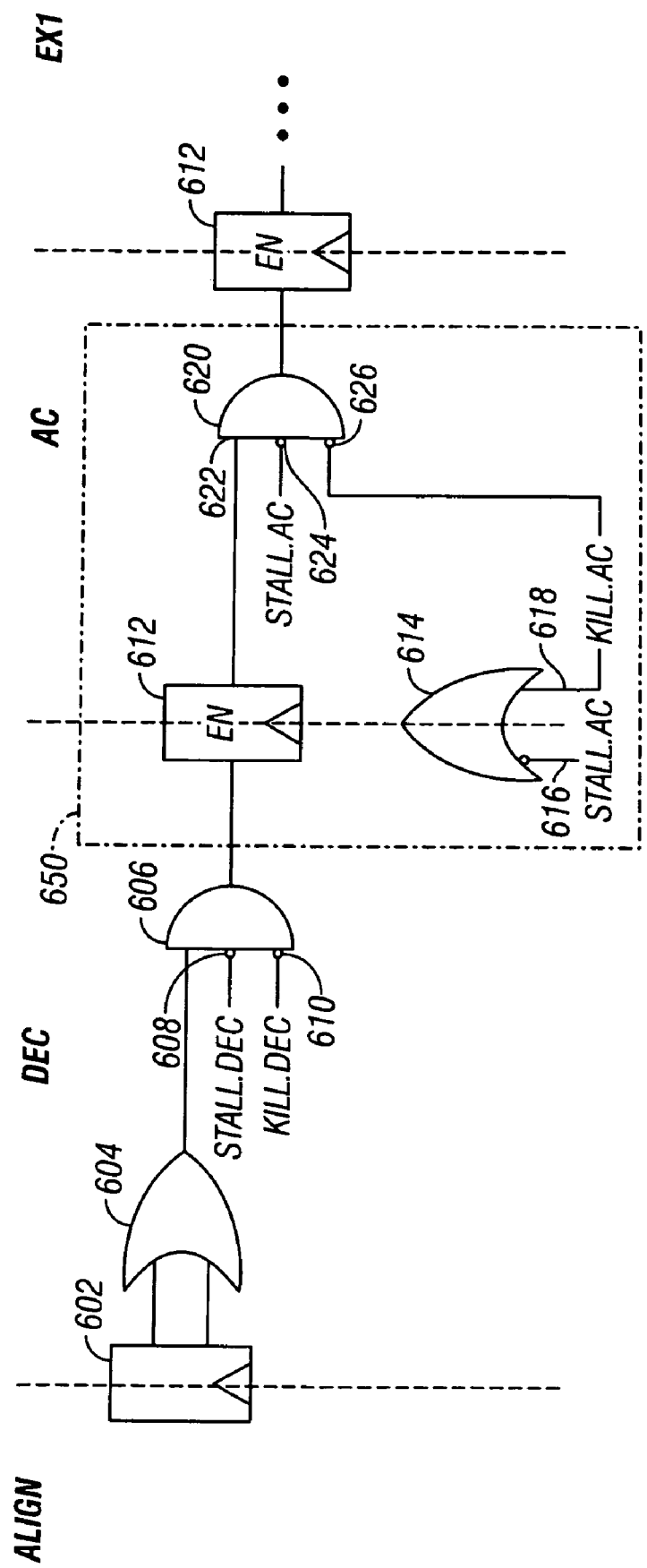
FIG. 6 illustrates a valid bit pipeline according to another embodiment.

FIG. 6 illustrates a valid bit pipeline 600 according to another embodiment. A width of an instruction in the pipeline may be determined in the alignment stage. The instruction width may be used for a pre-fetch operation and may enable faster decoding. According to an embodiment, the instruction width may also be used to generate a valid bit that may be associated with the instruction.

The valid bit pipeline 600 may include an instruction width register 602 in the alignment stage. The instruction width register 602 may be a 2-bit register. A 2-bit binary-word stored in the instruction width register 602 may indicate four instruction widths. According to an embodiment, the binary word "00" may indicate a 0-bit instruction, "01" may indicate a 16-bit instruction, "10" may indicate a 32-bit instruction, and "11" may indicate a 64-bit instruction. The 0-bit instruction may be used to indicate an invalid instruction, for example, a "killed" instruction or a bubble inserted into the pipeline.

An instruction width value output from the instruction width register 602 may be input to an OR gate 604. The OR gate may output a valid bit with a LOW value (invalid) for a "00" width value and a HIGH value (valid) for the other width values, "01", "10", and "11". The instruction width register 602 and the OR gate 604 together may be used as the valid bit generator 502 of FIG. 5.

The valid bit output from the OR gate 604 may be input to a three-input AND gate 606. The AND gate 606 may include an inverted input 608 for a stall signal and an inverted input 610 for a kill signal for that stage. The AND gate 606 may output a valid bit with a HIGH value only if the value from the instruction width register 602 is non-zero and the instruction is not killed or stalled in the DEC stage, as indicated by the stall input 608 and kill input 610. The AND gate 606 may be used as the valid bit qualifier 504 of FIG. 5.

The value output from the AND gate 606 may be stored in a latch 612 in the address calculation (AC) stage. The latch 612 may be controlled by an OR gate 614. The OR gate 614 may be used as the latch enable circuit 512 of FIG. 5. The OR gate 614 may include an inverted input 616 for a stall signal and an input 618 for a kill signal. When program flow is sequential, the valid bit in the latch 612 may be output to the next stage, i.e., EX1, each cycle. However, in the event of a stall in the AC stage or downstream from the AC stage, the stall signal at the inverted input 616 may be HIGH. If the instruction has not been killed, as indicated by a LOW value at the kill input 618, the output of the OR gate 614 may be LOW and the latch 612 not enabled. In this case, the value of the valid bit in the latch 612 may be preserved while the AC stage is stalled and the instruction remains valid, that is, not killed. However, if the instruction in the AC stage has been killed, the HIGH value at the kill input 618 may produce a HIGH value at the OR gate 614 output. This may enable the latch 612 to pass the killed valid bit to the next stage. As described above, a stage may not be stalled for a killed instruction.

An AND gate 620 in the AC stage may include an input 622 for the value from the latch 612, an inverted input 624 for a stall signal, and an inverted input 626 for a kill signal. If the value output from the latch 612 is LOW, or if a stall signal or kill signal is transmitted to the AC stage, the AND gate 620 may produce a valid bit with a LOW value indicating an invalid instruction. However, if the value output from the latch 612 is HIGH and the AC stage is not stalled and the instruction has not been killed, the AND gate 620 may produce a valid bit with a HIGH value to pass down the pipeline. The AND gate 620 may be used as the valid bit qualifier 514 of FIG. 5.

The circuit 650 illustrated in FIG. 6 for the AC stage may be repeated in the subsequent pipeline stages, e.g., EX1, EX2, etc.

A number of embodiments of the invention have been described. Nevertheless, it will be understood that various modifications may be made without departing from the spirit and scope of the invention. Accordingly, other embodiments are within the scope of the following claims.

The invention claimed is:

1. An apparatus comprising:
   a digital signal processor including a pipeline having a plurality of pipeline stages;
   a valid bit generator in a first pipeline stage to generate a valid bit;
   a signal generator to generate and transmit stall signals and kill signals to a plurality of said pipeline stages;
   a first valid bit qualifier in a second pipeline stage to set the valid bit to an invalid value in response to receiving at least one of a stall signal and a kill signal;
   a first latch to store the valid bit output from the first valid bit qualifier;
   a first latch enable circuit connected to the first latch, said first latch enable circuit adapted to hold the valid bit in the first latch in response to receiving a stall signal; and
   a second valid bit qualifier in a third pipeline stage to set the valid bit output from the first latch to an invalid value in response to receiving at least one of a stall signal and a kill signal.

2. The apparatus of claim 1, further comprising:
   a second latch to store the valid bit output from the first valid bit qualifier;
   a second latch enable circuit connected to the second latch, said second latch enable circuit adapted to hold the valid bit in the second latch in response to receiving a stall signal; and
   a third valid bit qualifier in a fourth pipeline stage to set the valid bit output from the second latch to an invalid value in response to receiving at least one of a stall signal and a kill signal.

3. The apparatus of claim 1, wherein the valid bit generator comprises a 2-bit instruction width register connected to an OR gate having two inputs.

4. The apparatus of claim 1, wherein each of the first and second valid bit qualifiers include an AND gate comprising:
   an input to receive a valid bit;
   a first inverted input to receive a stall signal; and
   a second inverted input to receive a kill signal.

5. The apparatus of claim 1, wherein the latch enable circuit comprises an OR gate having an inverted input to receive a stall signal and an input to receive a kill signal.

6. A method comprising:
   generating a valid bit in a first pipeline stage in a pipeline including a plurality of pipeline stages;
   transmitting the valid bit to a second pipeline stage;

setting the valid bit to an invalid value in response to receiving at least one of a stall signal and a kill signal in the second pipeline stage;

storing the valid bit in a first latch in one of the second pipeline stage and a third pipeline stage;

holding the valid bit in the first latch in response to receiving a stall signal; and setting the valid bit output from the first latch to an invalid value in response to receiving at least one of a stall signal and a kill signal in the third pipeline stage.

7. The method of claim 6, wherein generating the valid bit comprises:

determining a width of an instruction in the first pipeline stage;

setting the valid bit to an invalid value in response to the width having a zero value; and setting the valid bit to a valid value in response to the width having a non-zero value.

8. The method of claim 6, further comprising:

storing the valid bit in the third pipeline stage; and holding the valid bit in the third pipeline stage in response to receiving a stall signal in the third.

9. An article including instructions residing on a machine-readable medium including machine-executable instructions to cause a machine to:

generate a valid bit in a first pipeline stage in a pipeline including a plurality of pipeline stages;

transmit the valid bit to a second pipeline stage;

set the valid bit to an invalid value in response to receiving at least one of a stall signal and a kill signal in the second pipeline stage;

store the valid bit in a first latch in one of the second pipeline stage and a third pipeline stage;

hold the valid bit in the first latch in response to receiving a stall signal; and set the valid bit output from the first latch to an invalid value in response to receiving at least one of a stall signal and a kill signal in the third pipeline stage.

10. The article of claim 9, wherein the instructions to cause the machine to generate the valid bit comprise instructions to cause the machine to:

determine a width of an instruction in the first pipeline stage;

set the valid bit to an invalid value in response to the width having a zero value; and set the valid bit to a valid value in response to the width having a non-zero value.

11. The article of claim 9, wherein the instructions to cause the machine to generate the valid bit comprise instructions to cause the machine to:

store the valid bit in the third pipeline stage; and hold the valid bit in the third pipeline stage in response to receiving a stall signal in the third.

* * * * *